(12) United States Patent
Bar-Ness et al.

(10) Patent No.: US 8,275,019 B2
(45) Date of Patent: Sep. 25, 2012

(54) TRANSMITTING AND RECEIVING SCHEMES FOR MULTIUSER SINGLE-CARRIER SPACE TIME SPREADING WITH FREQUENCY DOMAIN EQUALIZATION

(75) Inventors: Yeheskel Bar-Ness, Marlboro, NJ (US); Kodzovi Acolaste, Newark, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 578 days.

(21) Appl. No.: 12/485,814

(22) Filed: Jun. 16, 2009

(65) Prior Publication Data

US 2010/0316091 A1 Dec. 16, 2010

(51) Int. Cl.
*H04B 1/00* (2006.01)
(52) U.S. Cl. ........ 375/146; 375/141; 375/145; 375/260; 375/267; 375/295; 375/299; 455/101; 455/132; 455/500; 455/562.1; 370/320; 370/334; 370/335; 370/342; 370/343; 370/441; 370/479; 370/480; 341/173; 341/180
(58) Field of Classification Search .................. 375/141, 375/145, 146, 260, 267, 295, 299; 455/101, 455/132, 500, 562.1; 370/320, 334, 335, 370/342, 343, 441, 479, 480; 341/173, 180
See application file for complete search history.

(56) References Cited

U.S. PATENT DOCUMENTS

| 6,834,043 | B1 | 12/2004 | Vook et al. |
| 7,522,673 | B2 * | 4/2009 | Giannakis et al. ............ 375/267 |
| 7,873,021 | B2 * | 1/2011 | Petre et al. .................... 370/342 |
| 2007/0165705 | A1 * | 7/2007 | Coon ............................ 375/148 |
| 2008/0089441 | A1 | 4/2008 | Hwang et al. |

FOREIGN PATENT DOCUMENTS

WO 2006029050 A2 3/2006

OTHER PUBLICATIONS

Siavash M. Alamouti, A Simple Transmit Diversity Technique for Wireless Communications, IEEE Journal on Select Areas of Communications, Oct. 1998, pp. 1451-1458, vol. 16 No. 8.
Vahid Tarokh, Hamid Jararkhani, A. Robert Calderbank, Space-Time Block Coding for Wireless Communications: Performance Results, IEEE Journal on Selected Areas in Communications, Mar. 1999, vol. 17 No. 3.
King F. Lee, Douglas B. Williams, A Space-Time Transmitter Diversity Technique for Frequency Selective Fading Channels, Proceeding of the 2000 IEEE Sensor Array and Multichannel Signal Processing Workshop, 2000, pp. 149-152.
King F. Lee, Douglas B. Williams, A Space-Frequency Transmitter Diversity Technique for OFDM Systems, IEEE Global Telecommunications Conference, Nov. 27-Dec. 1, 2000, pp. 1473-1477, San Francisco, CA, USA.
Bertrand Hockwald, Thomas L. Marzetta, Constantinos B. Papadias, A Transmitter Diversity Scheme for Wideband CDMA Systems Based on Space-Time Spreading, IEEE Journal on Selected Areas in Communications, Jan. 2001, pp. 48-60, vol. 19 No. 1.
Mohamed Aljerjawi, Walaa Hamouda, Performance Analysis of Multiuser MIMO CDMA Systems in Fast-Fading Channels, Nov. 27-Dec. 1, 2006, pp. 1-6, San Francisco, CA, USA.

(Continued)

*Primary Examiner* — Leon Flores

(57) ABSTRACT

Examples are disclosed for transmitting and receiving schemes for multiuser single-carrier space time spreading (STS) with frequency domain equalization.

7 Claims, 9 Drawing Sheets

OTHER PUBLICATIONS

Lie-Liang Yang, Lajos Hanzo, Performance of Broadband Multicarrier DS-CDMA Using Space-Time Spreading-Assisted Transmit Diversity, IEEE Transactions on Wireless Communications, May 2005, pp. 885-894, vol. 4 No. 3.

David Falconer, Sirikiat Lek Ariyavisitakul, Snader Benyamin-Seeyar, Brian Eidson, Frequency Domain Equalization for Single-Carrier Broadband Wireless Systems, IEEE Communications Magazine, Apr. 2002, pp. 58-66, vol. 40 Is. 4.

Zhengdao Wang, Georgios B. Giannakis, Wireless Multicarrier Communications, IEEE Signal Processing Magazine, May 2000, pp. 29-48, vol. 17 Is. 3.

Yang Yang, Yong Huat Chew, Tjeng Thiang Tijhung, Adaptive Frequency-Domain Equalization for Space-Time Block-Coded DS-CDMA Downlink, IEEE International Conference on Communications, May 16-20, 2005, pp. 2343-2347, vol. 4, Seoul, Korea.

Michele Morelli, Umberto Mengali, A Comparison of Pilot-Aided Channel Estimation Methods for OFDM Systems, IEEE Transactions on Signal Processing, Dec. 2001, vol. 49 No. 12.

W. M. Younis et al., "Adaptive Frequency Domain Equalization of Space-Time Block-Coded Transmissions," in IEEE International Conference Acoustics, Speech and Signal Processing, Orlando, FL, May 2002, vol. 3, pp. 2353-2356.

International Search Report and Written Opinion for International Application No. PCT/US2010/038157 mailed on Sep. 7, 2010.

International Preliminary Report on Patentability for International Application No. PCT/US2010/038157 dated Dec. 16, 2011.

\* cited by examiner

800 A computer program product.

802 A signal bearing medium.

804 instructions for transmitting a first chip-block and a second chip-block over a single-carrier communication channel, which, when executed by logic, cause the logic to:

encode data in a first block of symbols and encode the data in a second block of symbols;

generate a first chip-block and a second chip-block, the generated first chip-block and the generated second chip-block separately including the first block of symbols and the second block of symbols that have been spread based, at least in part, on a first orthogonal spreading code and a second orthogonal spreading code and then combined; or initiate a transmission of the first chip-block with a transmitter through a first antenna and initiate a transmission of the second chip-block with the transmitter through a second antenna.

| 806 a computer-readable medium. | 808 a recordable medium. | 810 a communications medium. |

FIG. 8

TRANSMITTING AND RECEIVING SCHEMES FOR MULTIUSER SINGLE-CARRIER SPACE TIME SPREADING WITH FREQUENCY DOMAIN EQUALIZATION

BACKGROUND

Unless otherwise indicated herein, the approaches described in this section are not prior art to the claims in this application and are not admitted to be prior art by inclusion in this section.

A type of communication system using multiple antennas to wirelessly transmit copies of a data stream across a number of antennas may be referred to as a transmit diversity wireless communication system. A transmit diversity wireless communication system may space-time modulate encoded portions of a data stream (e.g., represented by symbol blocks) to improve reliability of data-transfer between a transmitter and a receiver. A typical scheme to space-time modulate a symbol block may include a period of time over which a first copy of a symbol block is transmitted from two transmit antennas over a communication channel and another period of time over which a second copy of the symbol block is transmitted from both antennas over the communication channel. When the symbol block is spread using orthogonal spreading codes, this type of space-time modulating of a symbol block may be referred to as space-time spreading (STS).

Examples of a transmit diversity wireless communication system using STS that may benefit from improved reliability of data-transfer between a transmitter and a receiver include a transmit diversity wireless communication system that employs a direct-sequence code-division-multiple-access (DS-CDMA) access methodology. A DS-CDMA employment for a transmit diversity wireless communication system using STS may include the use of a multicarrier system such as orthogonal frequency division multiplexing (OFDM) to spread a symbol block to be transmitted over a multi-carrier communication channel. However, the use of a multi-carrier system may lead to a high peak-to-average power ratio (PAPR).

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 8 illustrates a block diagram of an example computer program product; and

DETAILED DESCRIPTION

Figure 1:
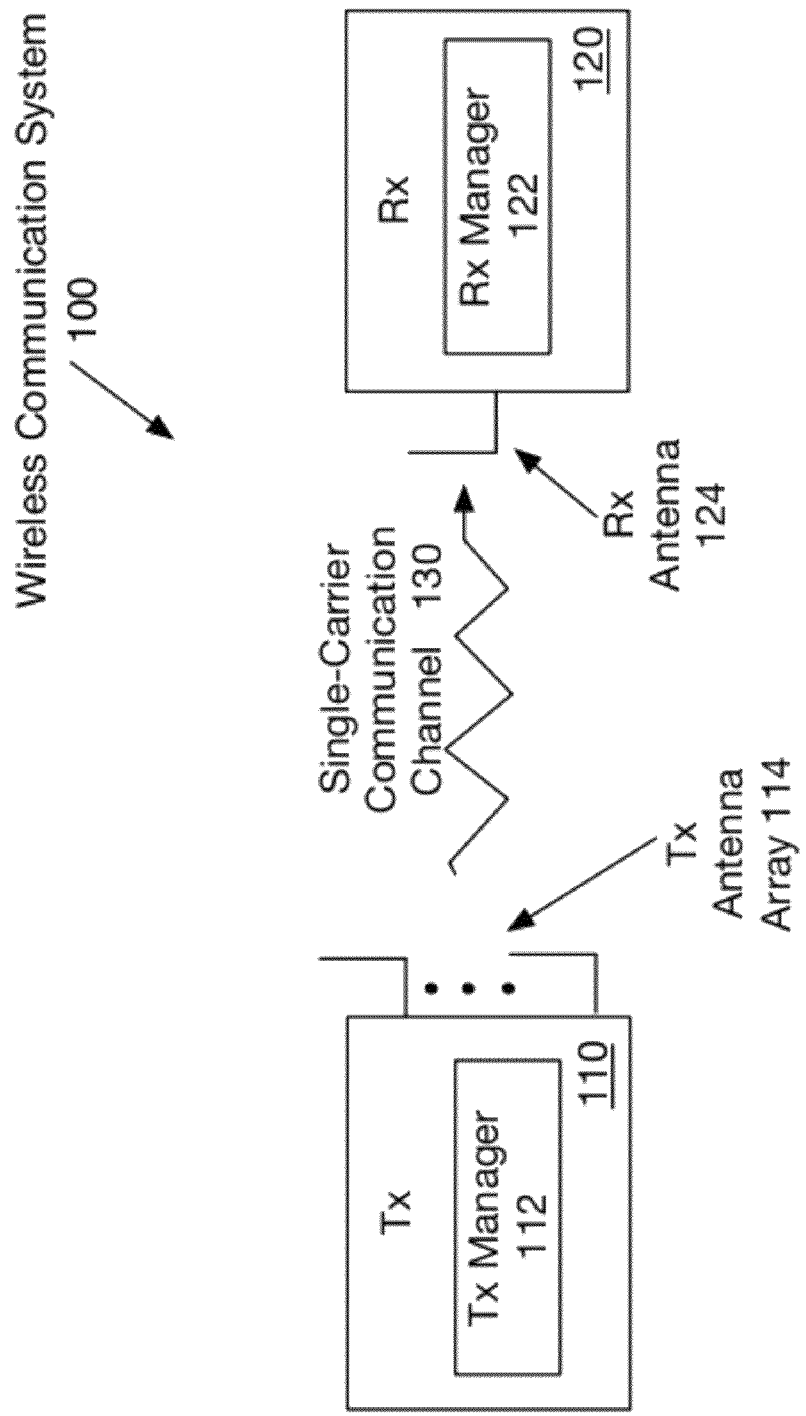
FIG. 1 illustrates an example wireless communication system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to transmitting and receiving schemes for multiuser single-carrier space time spreading (STS) with frequency domain equalization.

As contemplated in the present disclosure, a transmit diversity wireless communication system using a multicarrier system such as OFDM to transmit a data stream encoded in a symbol block transmitted over a multicarrier communication channel may lead to a high PAPR. A high PAPR typically causes unwanted distortion and spectral spread. As a result of the high PAPR causing unwanted distortion and spectral spread, highly linear and inefficient amplifiers may be required for transmitting the symbol block over the multicarrier communication channel. Moreover, sensitivities to frequency offset and radio frequency phase noise may also be problematic to a transmit diversity wireless communication system using OFDM. A single-carrier transmission with frequency domain equalization (SCFDE) is a possible way to transmit a data stream with a lower PAPR.

In some examples, methods are implemented for generating and transmitting chip-blocks through multiple antennas over a single-carrier communication channel in a transmit diversity wireless communication system. According to the example methods, data may be encoded in a first block of symbols and the data may also be encoded in a second block of symbols. A first chip-block and a second chip-block may then be generated. The first generated chip-block and the second generated chip-block may separately include the first block of symbols and the second block of symbols that have been spread based, at least in part, on a first orthogonal spreading code and a second orthogonal spreading code and then combined. The first chip-block may then be transmitted through a first antenna of a transmitter and the second chip-block may be transmitted through a second antenna of the transmitter.

In some examples, methods are also implemented for receiving chip-blocks transmitted through multiple antennas over a single-carrier communication channel in a transmit diversity wireless communication system and possibly decoding symbols included in the received chip-blocks. According to the example methods, a first chip-block and a second chip-block are received over a single-carrier communication channel. The first chip-block may have been transmitted from a first antenna of a transmitter and the second chip-block may have been transmitted from a second antenna of the transmitter. Also, the first chip-block and the second chip-block may separately include a first block of symbols and a second block of symbols that may have been spread based, at least in part, on a first orthogonal spreading code and a second orthogonal spreading code and then combined. A first received chip vector from the first chip-block and a second received chip vector from the second chip-block may then be generated. The first chip-block and the second chip-block included in the first and the second received chip vectors may be de-spread. The de-spreading may occur in the frequency domain. Further, an estimate of data associated with a symbol included in the first and second block of symbols may be generated. The estimate may occur in the time domain.

FIG. 1 illustrates an example wireless communication system 100. As shown in FIG. 1, wireless communication system 100 includes transmitter 110 and receiver 120. In some examples, the elements of wireless communication system 100 may be coupled via one or more communication channels. As depicted in FIG. 1 these one or more communication channels may include a single-carrier communication channel 130 coupling transmitter 110 to receiver 120. Single-carrier communication channel 130, for example, may be a multi-user, single-carrier wireless communication channel.

In some examples, wireless communication system 100 may operate as a transmit diversity wireless communication system. For example, as shown in FIG. 1, transmitter 110 includes a transmit (Tx) manager 112 and a Tx antenna array 114. Tx antenna array 114 may include ith number of antennas, i=1, 2, etc. As described more below, Tx manager 112 may include logic configured to generate and transmit or initiate the transmission of chip-blocks using at least two antennas from transmit antenna array 114. The chip-blocks, for example, may include at least a portion of a data stream encoded in blocks of symbols that have been spread based on orthogonal spreading codes and then combined for transmission to receiver 120. Receiver 120, for example, includes a receive (Rx) antenna 124 to receive the chip-blocks via single-carrier communication channel 130, although this disclosure is not limited to a receiver including one antenna. Receiver 120 may also include an Rx manager 122 having logic (described more below) configured to receive chip-blocks transmitted from transmitter 110 and to possibly decode data encoded in the received chip-blocks.

In some examples, receiver 120 may be located at or with a base station for wireless communication system 100. Although not shown in FIG. 1, one or more additional transmitters 110 may separately transmit chip-blocks to receiver 120 via single-carrier communication channel 130.

Figure 2:
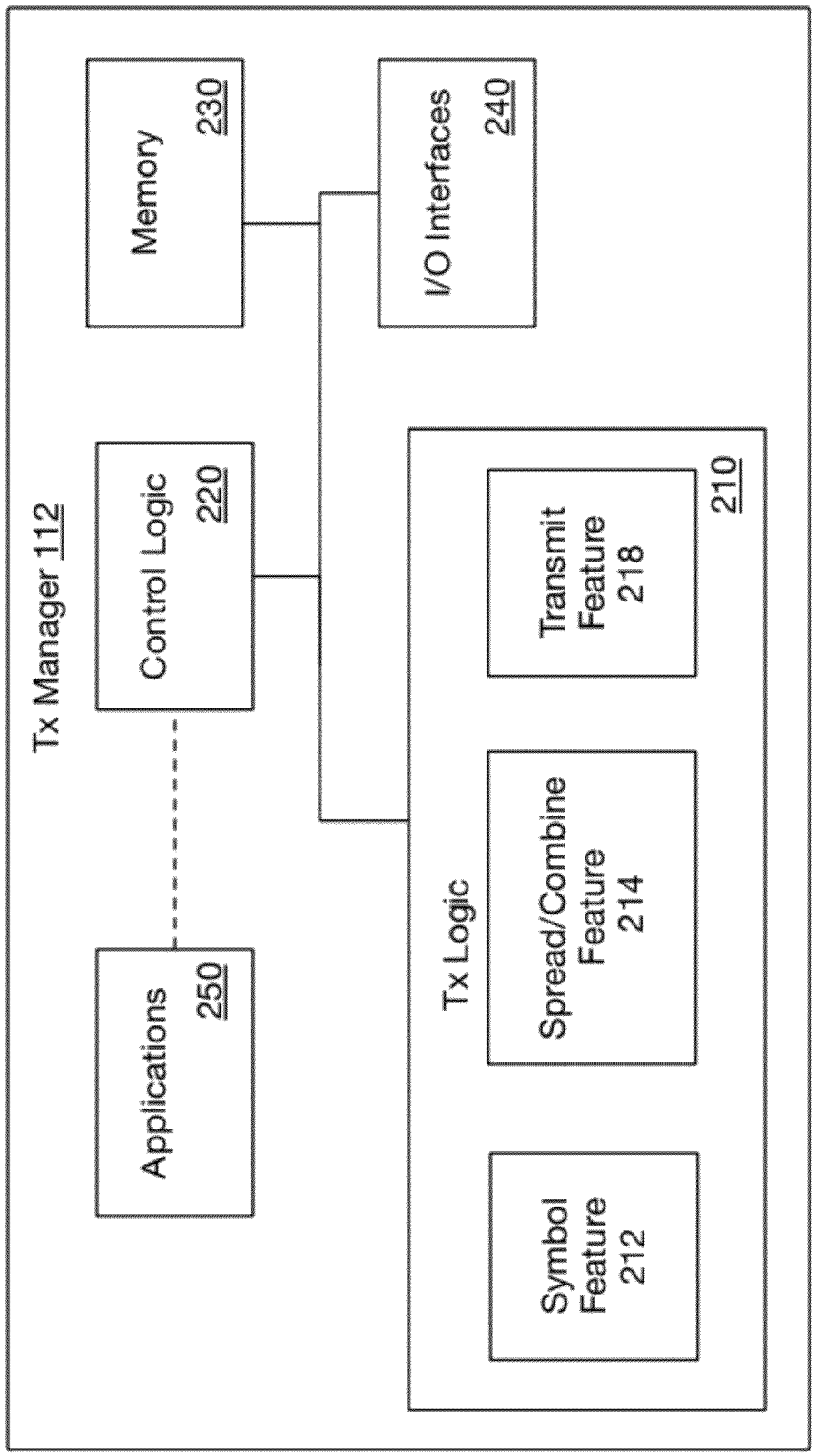
FIG. 2 illustrates a block diagram of an example architecture for a transmit manager.

FIG. 2 illustrates a block diagram of an example architecture for a transmit (Tx) manager 112. As described above for wireless communication system 100 in FIG. 1, transmitter 110 includes Tx manager 112. In some examples, Tx manager 112 includes features and/or logic configured or arranged to generate and transmit chip-blocks using at least two antennas from transmit antenna array 114 via a communication channel (e.g., single-carrier communication channel 130).

The example Tx manager 112 of FIG. 2, includes Tx logic 210, control logic 220, memory 230, input/output (I/O) interfaces 240 and optionally one or more applications 250. As illustrated in FIG. 2, Tx logic 210 is coupled to control logic 220, memory 230 and I/O interfaces 240. Also illustrated in FIG. 2, the optional applications 250 are arranged in cooperation with control logic 220. Tx logic 210 may further include one or more of a symbol feature 212, spread/combine feature 214 and a transmit feature 216, or any reasonable combination thereof.

In some examples, the elements portrayed in FIG. 2's block diagram are configured to support or enable Tx manager 112 as described in this disclosure. A given Tx manager 112 may include some, all or more elements than those depicted in FIG. 2. For example, Tx logic 210 and control logic 220 may separately or collectively represent a wide variety of logic device(s) to implement the features of Tx manager 112. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, Tx logic 210 includes one or more of a symbol feature 212, a spread/combine feature 214 and a transmit feature 216. Tx logic 210 may be configured to use one or more of these features to perform operations. As described in more detail below, example operations may include generating and transmitting or initiating the transmission of chip-blocks using at least two antennas from transmit antenna array 114. The chip-blocks, for example, may include at least a portion of a data stream encoded in blocks of symbols that have been spread and combined for transmission over a communication channel, e.g., a single-carrier communication channel.

In some examples, control logic 220 may be configured to control the overall operation of Tx manager 112. As mentioned above, control logic 220 may represent any of a wide variety of logic device(s) configured to operate in conjunction with executable content or instructions to implement the control of Tx manager 112. In some alternate examples, the features and functionality of control logic 220 may be implemented within Tx logic 210.

According to some examples, memory 230 is arranged to store executable content or instructions. The executable content or instructions may be used by control logic 220 and/or Tx logic 210 to implement or activate features or elements of Tx manager 112. Memory 230 may also be arranged to temporarily maintain data to be encoded and transmitted from transmitter 110.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between Tx manager 112 and elements resident on or located with transmitter 110. I/O interfaces 240 may include interfaces that operate according to various communication protocols to communicate over the internal communication link (e.g., Inter-Integrated Circuit (I²C), System Management Bus (SMBus) or Serial Peripheral Interface Bus (SPI), etc.). I/O interfaces 240 may also provide an interface between Tx manager 112 and elements coupled to transmitter 110 such as receiver 120. As mentioned above for FIG. 1, transmitter 110 may couple to these elements via single-carrier communication channel 130. The I/O interfaces 240, for example, include an interface configured to operate according to various wireless communication protocols to allow Tx manager 112 to communicate over single-carrier communication channel 130 (e.g., Code Division Multiple Access 2000 (CDMA2000)).

In some examples, Tx manager 112 includes one or more applications 250 to provide instructions to control logic 220 and/or Tx logic 210. Instructions, for example, may include instructions for TX manager 112 to implement or use one or more of a symbol feature 212, a spread/combine feature 214 and a transmit feature 216.

Figure 3:
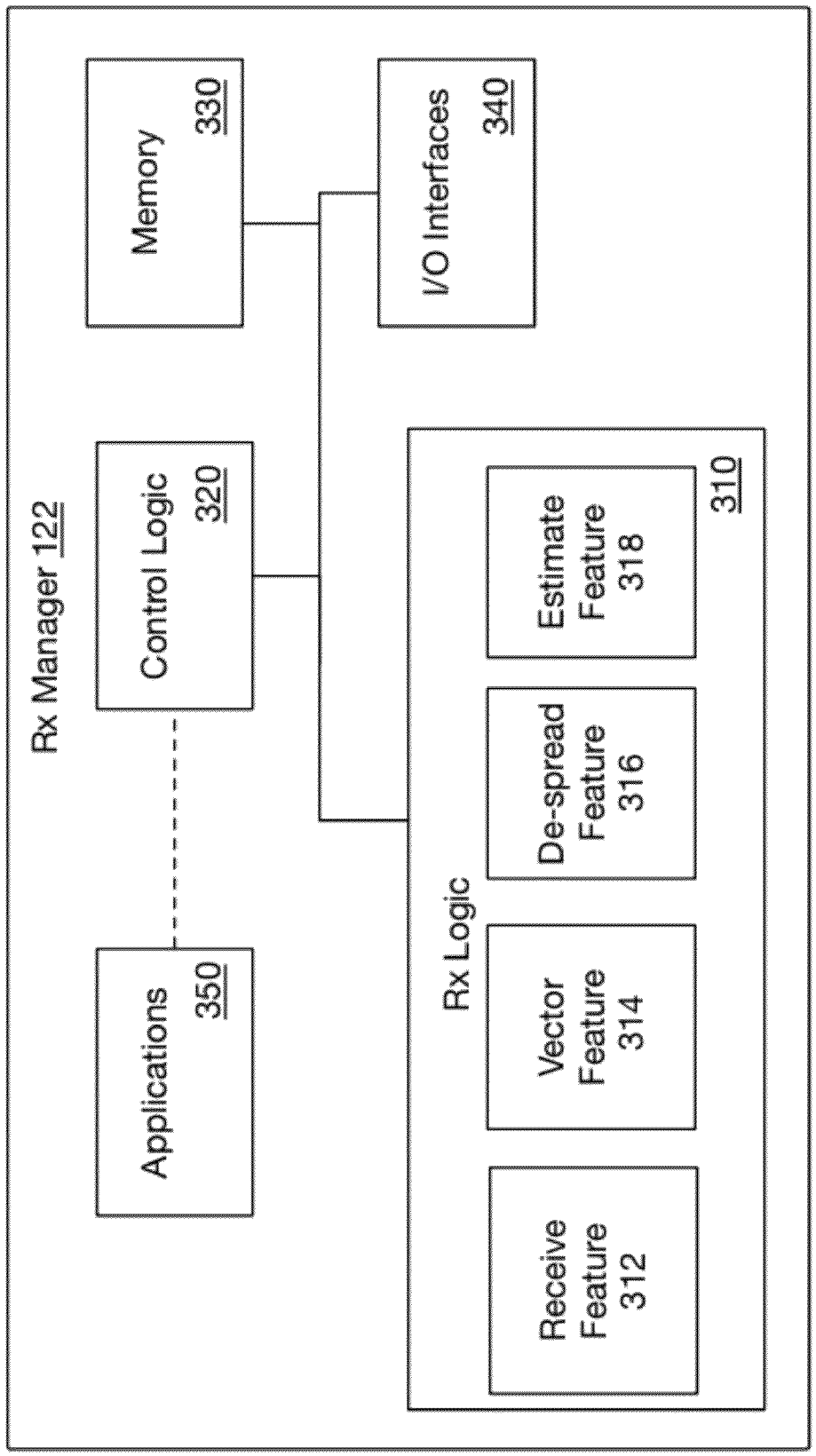
FIG. 3 illustrates a block diagram of an example architecture for a receive manager.

FIG. 3 illustrates a block diagram of an example architecture for a receiver (Rx) manager 122. As described above for wireless communication system 100 in FIG. 1, receiver 120 includes Rx manager 122. In some examples, Rx manager 122 includes features and/or logic configured or arranged to receive chip-blocks transmitted from transmitter 110 (e.g., via single-carrier communication channel 130) and to possibly decode data encoded in the received chip-blocks.

The example Rx manager 122 of FIG. 3, includes Rx logic 310, control logic 320, memory 330, input/output (I/O) interfaces 340 and optionally one or more applications 350. As illustrated in FIG. 3, Rx logic 310 is coupled to control logic 320, memory 330 and I/O interface 340. Also illustrated in FIG. 3, the optional applications 350 are arranged in cooperation with control logic 320. Rx logic 310 may further include one or more of a receive feature 312, a vector feature 314, a de-spread feature 316 and an estimate feature 318, or any reasonable combination thereof.

In some examples, the elements portrayed in FIG. 3's block diagram are configured to support or enable Rx manager 122 as described in this disclosure. A given Rx manager 122 may include some, all or more elements than those depicted in FIG. 3. For example, Rx logic 310 and control logic 320 may separately or collectively represent a wide variety of logic device(s) to implement the features of Rx manager 122. As mentioned previously, an example logic device may include one or more of a computer, a microprocessor, a microcontroller, an FPGA, an ASIC, a sequestered thread or a core of a multi-core/multi-threaded microprocessor or a combination thereof.

In some examples, as shown in FIG. 3, Rx logic 310 includes one or more of a receive feature 312, a vector feature 314, a de-spread feature 316 and an estimate feature 318. Rx logic 310 may be configured to use one or more of these features to perform operations. As described in more detail below, example operations may include one or more of receiving chip-blocks (e.g., from transmitter 110 via single-carrier communication channel 130), generating received chip vectors, de-spreading chip-blocks included in the received chip vectors and generating an estimate of data associated with symbols included in the received chip-blocks.

In some examples, control logic 320 may be configured to control the overall operation of Rx manager 122. As mentioned above, control logic 320 may represent any of a wide variety of logic device(s) configured to operate in conjunction with executable content or instructions to implement the control of Rx manager 122. In some alternate examples, the features and functionality of control logic 320 may be implemented within Rx logic 310.

Similar to memory 230 as described above, memory 330 may include a wide variety of memory media. According to some examples, memory 330 is arranged to store executable content or instructions. The executable content or instructions may be used by control logic 320 and/or Rx logic 310 to implement or activate features or elements of Rx manager 122. Memory 330 may also be arranged to temporarily maintain at least portions of received encoded data as the encoded data is decoded at receiver 120.

Similar to I/O interfaces 240 as described above, I/O interfaces 340 may provide an interface via an internal communication medium or link between Rx manager 122 and elements resident on or located with receiver 120. I/O interfaces 340 may also provide an interface between Rx manager 122 and elements coupled to receiver 120 such as transmitter 110.

In some examples, Rx manager 122 includes one or more applications 350 to provide instructions to control logic 320 and/or Rx logic 310. Instructions, for example, may include instructions for Rx manager 122 to implement or use one or more of a receive feature 312, a vector feature 314, a de-spread feature 316 and an estimate feature 318.

In some examples, Tx manager 112 and Rx manager 122 may be arranged or configured to implement transmitting and receiving schemes for multiuser single-carrier STS with frequency domain equalization. As described more below, example transmitting and receiving schemes may include a chip-superimposed-STS scheme and a chip-interleaved-STS scheme.

In some examples, transmitting and receiving schemes may include the use of equations or algorithms to encode, transmit and decode data via a communication channel (e.g., single-carrier communication channel 130). The equations or algorithms may be implemented based on wireless communication system 100 including a number of transmitters 110 equipped with two uncorrelated antennas (e.g., included in Tx antenna array 114). A particular transmitter 110 may be denoted by user u in the equations or algorithms and may transmit encoded data to a receiver 120. In some examples, the receiver 120 may be a base station equipped with one or more antennas.

For the example equations used to encode, transmit and decode data, symbol blocks of encoded data are represented by $s_i^{(u)}$, where $s_i^{(u)} = [s_i^{(u)}(0), s_i^{(u)}(1), \ldots, s_i^{(u)}(N/2-1)]^T$, $i=1,2$, denotes two blocks of N/2 data symbols at the input of user u transmitter 110. Also, $S_i^{(u)} = [S_i^{(u)}(0), S_i^{(u)}(1), \ldots, S_i^{(u)}(N/2-1)]^T$ may denote the N/2-point discrete Fourier Transform (DFT) of $s_i^{(u)}$. User u of transmitter 110 may also be assigned two normalized orthogonal spreading codes of length G.

The two orthogonal spreading codes may be denoted by $c^{(u,1)} = [c_0^{(u,1)}, c_1^{(u,1)}, \ldots, c_{G-1}^{(u,1)}]^T$ and $c^{(u,2)} = [c_0^{(u,2)}, c_1^{(u,2)}, \ldots, c_{G-1}^{(u,2)}]^T$. The two orthogonal spreading codes may be mutually orthogonal. Also, it may be assumed that the communication channel is quasi-static such that the communication channel may be constant during a transmission of a chip-block but may change independently from one chip-block to another.

As briefly mentioned above, example transmitting and receiving schemes may include a chip-superimposed-STS scheme. Tx manager 112 of transmitter 110 may include logic configured to implement the chip-superimposed-STS scheme by using at least a portion of the below described example equations (1) through (17). For example, a block-spreading on blocks of symbols $s_i^{(u)}$ using example equations (1) and (2) may be performed to construct or generate chip-blocks of length NG/2 for each ith antenna of Tx antenna array 114.

$$x_i^{(u)} = [x_{i,0}^{(u)}, x_{i,1}^{(u)}, \ldots, x_{i,g}^{(u)}, \ldots, x_{i,G-1}^{(u)}]^T, i=1,2 \quad (1)$$

Further, $x_{i,g}^{(u)}$, as used in example equation (1), may be referred to as a "chip-subblock". The chip-subblock $x_{i,g}^{(u)}$ may be generated by implementing example equation (2).

$$x_{1,g}^{(u)} = c_g^{(u,1)} s_1^{(u)} - c_g^{(u,2)} s_2^{(u)*}$$

$$x_{2,g}^{(u)} = c_g^{(u,1)} s_2^{(u)} + c_g^{(u,2)} s_1^{(u)*} \quad (2)$$

For example equation (2), $s_i^{(u)} = [s_i^{(u)}(0), s_i^{(u)}(N/2-1), \ldots, s_i^{(u)}(2), s_i^{(u)}(1)]^T$ i.e. $s_i^{(u)}(n) = s_i^{(u)}(-n)_N$ in which $(\cdot)_N$ is the modulo N operation. The scheme may be called chip-superimposed-STS scheme because as seen in example equation (2), the spread blocks of symbols $s_1^{(u)}$ are added to the spread blocks of $s_2^{(u)}$ to generate a chip-subblock. In some examples, the addition of the two spread blocks may result in a transmitted signal peak-to-average power ratio (PAPR) of 3 decibels (dB).

Figure 4:
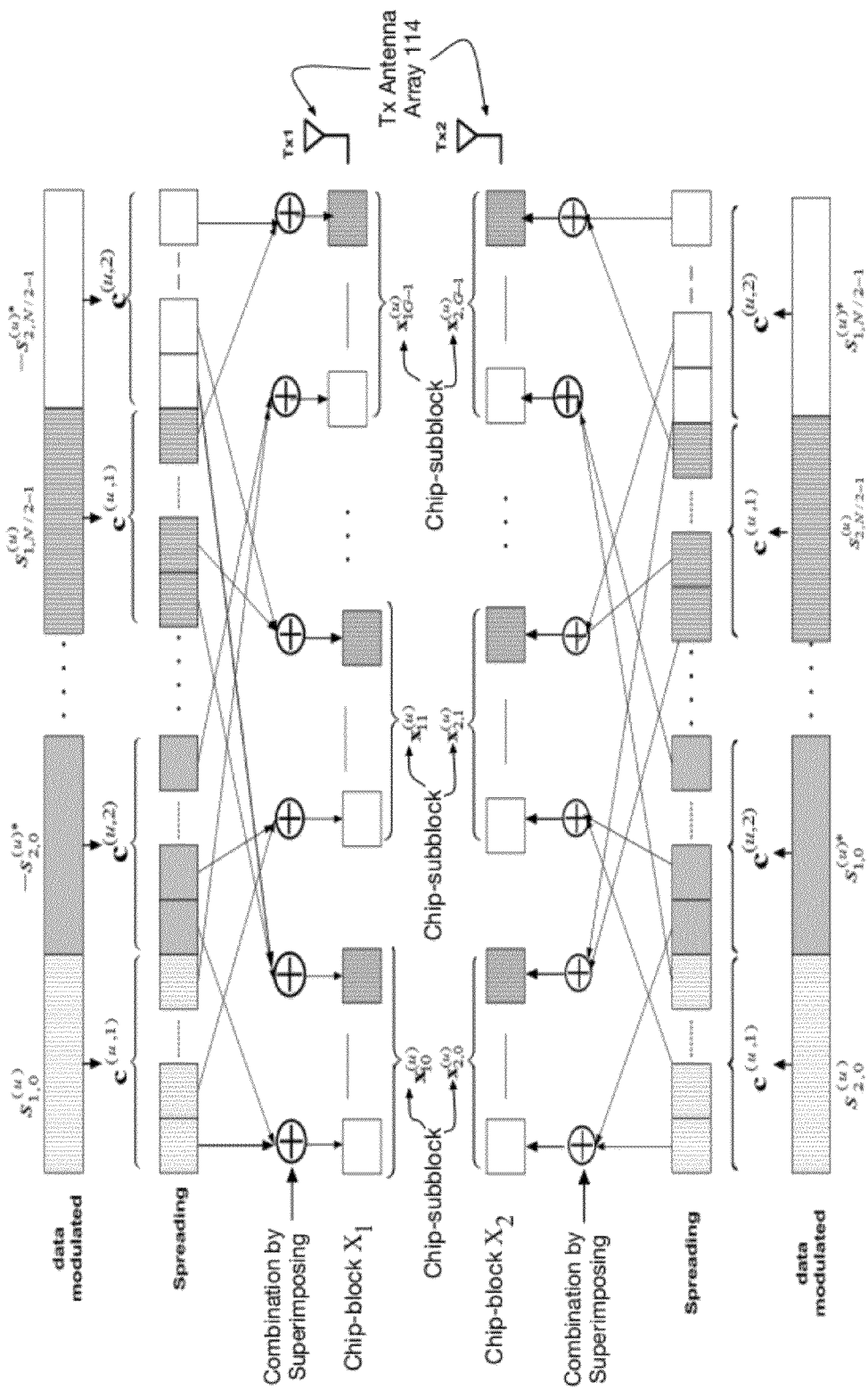
FIG. 4 illustrates an example scheme associated with generating chip-blocks by superimposing spread blocks of symbols.

FIG. 4 illustrates an example scheme associated with generating chip-blocks by superimposing spread blocks of symbols (e.g., chip-superimposed-STS scheme). In some examples, FIG. 4 illustrates how, by implementing example equation (2), blocks of data symbols $s_1^{(u)}$ and $s_2^{(u)}$ may be modulated, spread using orthogonal codes $c^{(u,1)}$ and $c^{(u,2)}$ and then combined to generate chip-subblocks $x_{1,g}^{(u)}$ and $x_{2,g}^{(u)}$. As shown in FIG. 4, the generated chip-subblocks $x_{1,g}^{(u)}$ and $x_{2,g}^{(u)}$ may be included in chip-blocks $X_1$ and $X_2$. Chip-subblocks $x_{1,g}^{(u)}$ and $x_{2,g}^{(u)}$ included in chip-blocks $X_1$ and $X_2$ may then be transmitted through $Tx_1$ and $Tx_2$ of Tx antenna array 114 (e.g., over single-carrier communication channel 130).

In some examples, to avoid inter chip-subblock interference (ICSI), a cyclic prefix (CP) of length P chips (chosen such that the duration of the CP is greater than the maximum delay spread of the communication channel $\tau_m$) may be separately added to each chip-subblock $x_{i,g}^{(u)}$ before transmission. Hence the transmitted chip-block or signal vector associated with the transmitted chip-block by the $i^{th}$ antenna of Tx antenna array 114 (e.g., $Tx_1$ and $Tx_2$) is given by a (N+L)G×1 vector.

$$\tilde{x}_i^{(u)} = [\tilde{x}_{i,0}^{(u)}, \tilde{x}_{i,1}^{(u)}, \ldots, \tilde{x}_{i,g}^{(u)}, \ldots, \tilde{x}_{i,G-1}^{(u)}]^T, \quad (3)$$

For example equation (3), $\tilde{x}_{i,g}^{(u)} = T_{CP} x_{i,g}^{(u)}$ and $T_{CP} = [J_{CP}^T, I_N]^T$ may be the (N+L)×N matrix that appends the CP to each chip-subblock. $J_{CP}$ may be an L×N matrix formed by the last L rows of the identity matrix $I_N$. A symbol block length of N may be chosen to be N>>L so that the overhead fraction due to insertion of a CP given by L/(N+L) is negligible. Transmitted chip-blocks including chip-subblocks having attached CPs may be derived as shown in example equation (4).

$$\tilde{x}_1^{(u)} = (c_1^{(u)} \otimes T_{CP}) s_1^{(u)} - (c_2^{(u)} \otimes T_{CP}) s_2^{(u)*}$$

$$\tilde{x}_2^{(u)} = (c_1^{(u)} \otimes T_{CP}) s_2^{(u)} - (c_2^{(u)} \otimes T_{CP}) s_1^{(u)*} \quad (4)$$

For example equation (4) and for other example equations described below, $\otimes$ stands for Kronecker product. In some examples, the signal received at Rx antenna 124 of receiver 120 (e.g., a base-station antenna) may be given by equation (5).

$$\tilde{r} = \sum_{u=1}^{U} \sum_{i=1}^{2} \tilde{x}_i^{(u)} * h_i^{(u)} + n \quad (5)$$

For example equation (5), $h_i^{(u)} = [h_i^{(u)}(0), h_i^{(u)}(1), \ldots, h_i^{(u)}(L-1)]^T$ denotes the L-taps multipath frequency selective fading characterization of the communication channel between the user u transmit antenna i of Tx antenna array 114 of transmitter 110 and Rx antenna 124 of receiver 120. Also, $\Sigma_{l=0}^{L-1} E\{|h_i^{(u)}(l)|^2\} = 1$; n is a zero-mean complex additive white Gaussia noise (AWGN) with variance $N_o$ and * denotes the linear convolution. As stated previously, it may be assumed that the communication channel is constant within one chip-block $\tilde{x}_i^{(u)}$ of duration $T_x = (N/2+P)GT_c$ (where $T_c$ is the chip duration) but may change from one chip-block to another.

In some examples, Rx manager 122 may include logic configured to first remove the CP in each chip-subblock included in a received chip-block $\tilde{x}_i^{(u)}$ to yield $r = V\tilde{r}$. Where V is a NG/2×(N/2+P)G block diagonal matrix and where each chip-block $\tilde{x}_i^{(u)}$ is given by the NG/2×(N/2+P) matrix $\tilde{T} = [0_{N/2 \times P} I_{N/2 \times N/2}]$ that results in the removal of the CP in each chip-subblock such that $V = I_{G \times G} \otimes \tilde{T}$. Hence the length of the resulting signal vector r for the received chip-block may be NG/2 and can be shown to be $r = [r_0, r_1, \ldots, r_g, \ldots, r_{G-1}]^T$. Example equation (6) shows how each received chip-block $r_g$ may be derived.

$$r_g = \sum_{u=1}^{U} \sum_{i=1}^{2} x_{i,g}^{(u)} * h_i^{(u)} + n_g \quad (6)$$

For example equation (6), * represents the circular convolution. In some examples, the result from example equation (6) may be due to communication channel impulse response $h_i^{(u)}$ being constant for the duration of chip-block $\tilde{x}_i^{(u)}$ and the CP turning the linear convolution into a circular one.

In some examples, Rx manager 122 may include logic configured to take the N/2-point DFT of each received chip-subblock by multiplying r by the NG/2×NG/2 block diagonal matrix $I_G \otimes Q_{N/2}$ where each chip-block is given by the N/2× N/2 DFT matrix $Q_{N/2}$ to yield a received chip vector $R = (I_G \otimes Q_{N/2})r$. Letting $R = [R_0^T, \ldots, R_g^T, \ldots, R_{G-1}^T]^T$, $R_g$, which represents the N/2-point DFT of $r_g$, is shown in example equation (7).

$$R_g = \sum_{u=1}^{U} \sum_{i=1}^{2} \Lambda_i^{(u)} X_{i,g}^{(u)} + N_g \quad (7)$$

For example equation (7), $\Lambda_i^{(u)}$ represents a diagonal matrix whose diagonal elements are the N/2-point DFT of $h_i^{(u)}$ and the vectors $X_{i,g}^{(u)}$ and $N_g$ are the N/2-point DFT of $x_{i,g}^{(u)}$ and $n_g$, respectively.

In some examples, using example equation (2), it can be shown that $X_{i,g}^{(u)}$ is given by example equation (8).

$$X_{1,g}^{(u)} = c_g^{(u,1)} S_1^{(u)} - c_g^{(u,2)} S_2^{(u)*}$$

$$X_{2,g}^{(u)} = c_g^{(u,1)} S_2^{(u)} + c_g^{(u,2)} S_1^{(u)*} \quad (8)$$

For example equation (8), the N/2-point DFT of $s_i^{(u)*}$ may be given by $S_i^{(u)*}$. Plugging example equation (8) in example equation (7), example equation (9) is derived.

$$R_g = \sum_{u=1}^{U} c_g^{(u,1)} (\Lambda_1^{(u)} S_1^{(u)} + \Lambda_2^{(u)} S_2^{(u)}) + c_g^{(u,2)} (\Lambda_2^{(u)} S_1^{(u)*} - \Lambda_1^{(u)} S_2^{(u)*}) + N_g \quad (9)$$

Using example equation (9), $R = [R_0^T, \ldots, R_g^T, \ldots, R_{G-1}^T]^T$ can be written as shown in example equation (10).

$$R_g = \sum_{u=1}^{U} (c_g^{(u,1)} \otimes I_{N/2})(\Lambda_1^{(u)} S_1^{(u)} + \Lambda_2^{(u)} S_2^{(u)}) + \\ (c^{(u,2)} \otimes I_{N/2})(\Lambda_2^{(u)} S_1^{(u)*} - \Lambda_1^{(u)} S_2^{(u)*}) + N \quad (10)$$

For example equation (10), $N = [N_0^T, N_1^T, \ldots, N_{G-1}^T]^T$. The de-spreading of the received chip vector R may be done in the frequency domain by multiplying R with $(c^{(u,1)T} \otimes I_{N/2})$ and $(c^{(u,2)T} \otimes I_{N/2})$ to yield $Z^{(u,1)}$ and $Z^{(u,2)}$, respectively, as shown in example equation (11) below.

$$Z^{(u,1)} = (c^{(u,1)T} \otimes I_{N/2})R \qquad (11)$$
$$= \Lambda_1^{(u)} S_1^{(u)} + \Lambda_2^{(u)} S_2^{(u)} + N^{(u,1)}$$

$$Z^{(u,2)} = (c^{(u,2)T} \otimes I_{N/2})R$$
$$= \Lambda_2^{(u)} S_1^{(u)*} - \Lambda_1^{(u)} S_2^{(u)*} + N^{(u,2)}$$

In some examples, the following identities of Kronecker products may be used as shown in example equation (12).

$$(A_1 \otimes A_2)(A_3 \otimes A_4) = (A_1 A_3)(A_2 A_4) \qquad (12)$$

In some examples, where $N^{(u,i)} = (c^{(u,i)T} \otimes I_{N/2})N$, example equation (11) can be combined and presented in a matrix form as shown in example equation (13).

$$Z^{(u)} = \begin{bmatrix} \Lambda_1^{(u)} & \Lambda_2^{(u)} \\ \Lambda_2^{(u)*} & -\Lambda_1^{(u)*} \end{bmatrix} \begin{bmatrix} S_1^{(u)} \\ S_2^{(u)} \end{bmatrix} + \begin{bmatrix} N^{(u+1)} \\ N^{(u,2)*} \end{bmatrix} \qquad (13)$$
$$\triangleq \Lambda^{(u)} S^{(u)} + N^{(u)}.$$

For example equation (13), $Z^{(u)} = [Z^{(u,1)T}, Z^{(u,2)T}]^T$. In some examples, a simple linear receiver for receive 120 (not shown) may yield example equation (14).

$$\hat{S}^{(u)} = (\Lambda^{(u)H}\Lambda^{(u)} + \alpha(N_o/E_s)I_N)^{-1}\Lambda^{(u)H}Z^{(u)}, \qquad (14)$$

For example equation (14), $\alpha=1$ for a mean mean square error (MMSE) receiver and $\alpha=2$ for a Zero-forcing (ZF) receiver.

In some examples, Rx manager 122 may include logic configured to take an N/2-point inverse fast Fourier transform (IFFT) to generate an estimate of data associated with a symbol. The estimate, for example, to occur in the time domain. The symbol to be estimated, for example, was included in a first and a second block of symbols received in a chip-block transmitted from transmitter 110 and further included in the received chip vector $R_g$ generated as described for example equation (7). The matrix $\Lambda^{(u)H}\Lambda^{(u)}$ may be diagonal and may be given by example equation (15).

$$\Lambda^{(u)H}\Lambda^{(u)} = \begin{bmatrix} \Delta^{(u)} & 0_{(N/2)x(N/2)} \\ 0_{(N/2)x(N/2)} & \Delta^{(u)} \end{bmatrix} \qquad (15)$$

For example equation (15), the N/2×N/2 diagonal matrix $\Delta^{(u)}$ elements may be given as shown in example equation (16).

$$\Delta_{k,k}^{(u)} = |\Lambda_1^{(u)}|_{k,k}^2 + |\Lambda_2^{(u)}|_{k,k}^2 \qquad (16)$$

In some examples, an output signal-to-noise ratio (SNR) of a matched filter for receiver 120 (not shown) can be given by example equation (17).

$$\mu(k) = (|\Lambda_1^{(u)}|_{k,k}^2) + (|\Lambda_2^{(u)}|_{k,k}^2)\gamma_o \qquad (17)$$

For example equation (17), $k=0, 2, \ldots, N/2-1$ and where $\gamma_0 = E_s/N_0$. It may be seen that the chip-superimposed-STS scheme may achieve a second order diversity and that the SNR $\mu(k)$ has a central chi-square distribution with four degrees of freedom with probability density function (pdf) given by $p(\gamma) = (\gamma/\gamma_0) \exp(-\gamma/\gamma_0)$.

As briefly mentioned above, example transmitting and receiving schemes may also include a chip-interleaved-STS scheme. Tx manager 112 of transmitter 110 may include logic configured to implement the chip-interleaved-STS scheme by using at least a portion of the below described example equations (18) through (30). The logic may also use some of the example equations (1) through (17) as described above to implement the chip-interleaved-STS scheme. For example, a block-spreading on blocks of symbols $s_i^{(u)}$ using example equations (18) and (19) may be performed to construct or generate space-time spreading chip-blocks of length NG/2 for each ith antenna of Tx antenna array 114. Note that example equation (18) is similar to example equation (1) with the exception that the chip-block $x_i^{(u)}$ of (1) is denoted in equation (18) as $\bar{x}_i^{(u)}$.

$$\bar{x}_i^{(u)} = [\bar{x}_{i,0}^{(u)}, \bar{x}_{i,1}^{(u)}, \ldots, \bar{x}_{i,g}^{(u)}, \ldots, \bar{x}_{i,G-1}^{(u)}]^T, i=1,2 \qquad (18)$$

Further, $\bar{x}_i^{(u)}$ as used in example equation (18), may be a chip-subblock. The chip-subblock may be generated by implementing example equation (19).

$$\bar{x}_{1,g}^{(u)} = c_g^{(u,1)} \vec{s}_1^{(u)} - c_g^{(u,2)} \tilde{s}_2^{(u)*}$$
$$\bar{x}_{2,g}^{(u)} = c_g^{(u,1)} \vec{s}_2^{(u)} + c_g^{(u,2)} \tilde{s}_1^{(u)*} \qquad (19)$$

For example equation (19), $\vec{s}_i^{(u)}$ and $\tilde{s}_i^{(u)}$ are derived as shown in example equation (20).

$$\vec{s}_i^{(u)} = [s_i^{(u)}(0), 0, s_i^{(u)}(1), 0, \ldots, s_i^{(u)}(N/2-1), 0]^T$$
$$\tilde{s}_i^{(u)} = [0, s_i^{(u)}(0), 0, s_i^{(u)}(N/2-1), \ldots, 0, s_i^{(u)}(1)]^T \qquad (20)$$

As mentioned above for the chip-superimposed-STS scheme (see example equation (2)), spread blocks of symbols $s_1^{(u)}$ are added to spread blocks of $s_2^{(u)}$ to generate a chip-subblock $x_i^{(u)}$. However, for the chip-interleaved-STS scheme, a chip-subblock $\bar{x}_i^{(u)}$ may be generated by interleaving spread blocks of symbols $s_1^{(u)}$ with spread blocks of $s_2^{(u)}$, e.g., through implementation of example equation (19). Since the chip-interleaved-STS scheme interleaves spread blocks of symbols rather than adding or superimposing the spread blocks of symbols, the size for the chip-subblock $\bar{x}_i^{(u)}$ may be NG. In some examples, the size of NG for the chip-subblock may be $\bar{x}_i^{(u)}$ twice as large as the above mentioned size of NG/2 for the superimposed generated chip-subblock $x_i^{(u)}$. But since there is no superimposition when implementing the chip-interleaved-STS scheme to generate a chip-subblock, the PAPR associated with transmitting chip-subblocks included in a chip-block can be substantially lower (3 dB less than the superimposed-STS scheme). Hence, two possible differences between the two schemes are PAPR and duration of a transmitted chip-block.

Figure 5:
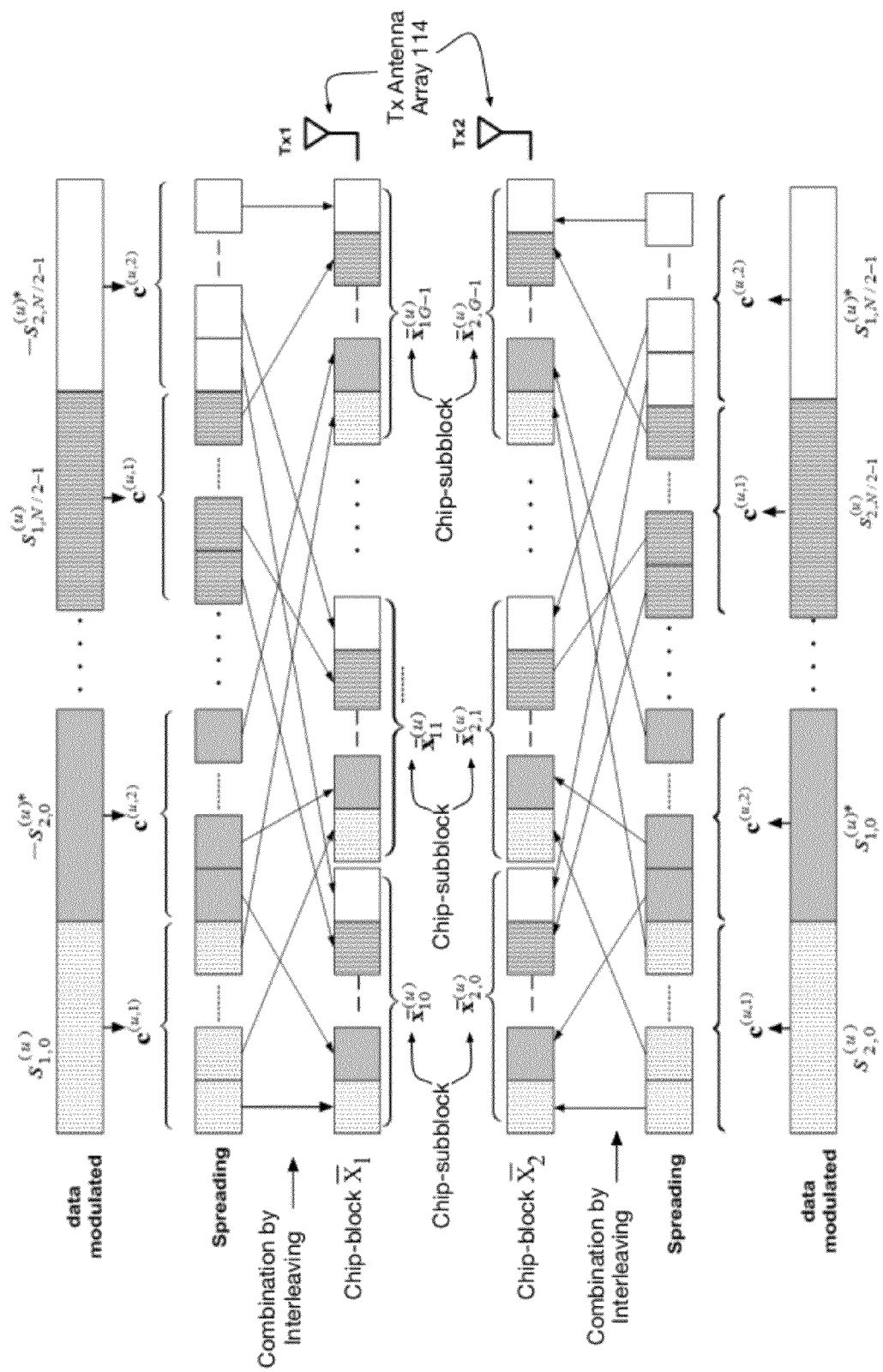
FIG. 5 illustrates an example scheme associated with generating chip-blocks by interleaving spread blocks of symbols.

FIG. 5 illustrates an example scheme associated with generating chip-blocks by interleaving spread blocks of symbols (e.g., chip-interleaved-STS scheme). In some examples, FIG. 5 illustrates how, by implementing example equation (19), blocks of data symbols $s_1^{(u)}$ and $s_2^{(u)}$ may be modulated, spread using orthogonal codes $c^{(u,1)}$ and $c^{(u,2)}$ and then combined to generate chip-subblocks $\bar{x}_{1,g}^{(u)}$ and $\bar{x}_{2,g}^{(u)}$. As shown in FIG. 5, the generated chip-subblocks $\bar{x}_{1,g}^{(u)}$ and $\bar{x}_{2,g}^{(u)}$ may be included in chip-blocks $\bar{X}_1$ and $\bar{X}_2$. Chip-subblocks $\bar{x}_{1,g}^{(u)}$ and $\bar{x}_{2,g}^{(u)}$ included in chip-blocks $\bar{X}_1$ and $\bar{X}_2$ may then be transmitted through $Tx_1$ and $Tx_2$ of Tx antenna array 114 (e.g., over single-carrier communication channel 130).

In some examples, as mentioned above for the chip-superimposed-STS scheme, a CP may be inserted or attached to each chip-subblock to avoid inter chip-subblock interference (ICSI). The insertion of the CP may be done by implementing example equation (3) as described above. Chip-blocks $\bar{X}_1$ and $\bar{X}_2$ may then be transmitted through $Tx_1$ and $Tx_2$ of Tx antenna array 114 to a receiver 120 (e.g., at a base station). In some examples, the signal received at Rx antenna 124 of receiver 120 may be depicted as shown in example equation (5). Further, in some examples Rx manager 122 may include logic configured to first remove the CP in each chip-subblock $\bar{x}_{1,g}^{(u)}$ and $\bar{x}_{2,g}^{(u)}$. The logic may also be configured to implement example equation (6) to obtain each received chip-block $\bar{r}_g$.

In some examples, Rx manager 122 may also include logic configured to take the N-point DFT of each received chip-subblock $\bar{r}_g$ by multiplying $\bar{r}_g$ by an NG/2×NG/2 block diagonal matrix $I_G \otimes Q_{N/2}$ where each chip-block is given by the N/2×N/2 DFT matrix $Q_{N/2}$ to yield a received chip vector $\bar{R} = (I_G \otimes Q_{N/2}) \bar{r}_g$. Letting $\bar{R} = [\bar{R}_0, \bar{R}_1, \ldots \bar{R}_g, \ldots \bar{R}_{G-1}]^T$, $\bar{R}_g$, which represents the N-point DFT of $\bar{r}_g$, is shown in example equation (21).

$$\bar{R}_g = \sum_{u=1}^{U} \Lambda_1^{(u)} \bar{X}_{1,g}^{(u)} + \Lambda_2^{(u)} X_{2,g}^{(u)} + \bar{N}_g \tag{21}$$

From example equations (19) and (20) it can shown that $\bar{X}_{i,g}^{(u)}$ may be given by example equation (22).

$$\bar{X}_{1,g}^{(u)} = c_g^{(u,1)} S_{1,(N/2)}^{(u)} - c_g^{(u,2)} W_N S_{2,(N/2)}^{(u)*}$$

$$\bar{X}_{2,g}^{(u)} = c_g^{(u,1)} S_{2,(N/2)}^{(u)} + c_g^{(u,2)} W_N S_{1,(N/2)}^{(u)*} \tag{22}$$

For example equation (22), it may be defined that $S_{i,(N/2)}^{(u)} = \sqrt{1/2}[S_i^{(u)T}, S_i^{(u)T}]^T$, which is a repetition of $S_i^{(u)}$ due to the zero insertion in example equation (20) and due to $W_N = \text{diag}(1, e^{2\pi/N}, e^{2\pi 2/N}, \ldots, e^{2\pi(N-1)/N})$ which may be the result of a shift property of the DFT. In some examples, similar to what was described above for the chip-superimposed-STS scheme, received chip vector $\bar{R}$ may be expressed as shown in example equation (23).

$$\bar{R} = \sum_{u=1}^{U} (c^{(u,1)} \otimes I_N)(\Lambda_1^{(u)} S_{1,(N/2)}^{(u)} + \Lambda_2^{(u)} S_{2,(N/2)}^{(u)}) + \tag{23}$$

$$(c^{(u,2)} \otimes I_N)(\Lambda_1^{(u)} W_N S_{1,(N/2)}^{(u)*} - \Lambda_1^{(u)} W_N S_{2,(N/2)}^{(u)*}) + \bar{N}$$

For example equation (23), $\bar{N} = [\bar{N}_0^T, \bar{N}_1^T, \ldots \bar{N}_{G-1}^T]^T$. The de-spreading of the received chip vector $\bar{R}$ is done in the frequency domain by multiplying $\bar{R}$ with $(c^{(u,1)T} \otimes I_N)$ and $(c^{(u,2)T} \otimes I_N)$ to yield $\bar{Z}^{(u,1)}$ and $\bar{Z}^{(u,2)}$, respectively, as shown in example equation (24).

$$\bar{Z}^{(u,1)} = (c^{(u,1)T} \otimes I_N)\bar{R} \tag{24}$$
$$= \Lambda_1^{(u)} S_{1,(N/2)}^{(u)} + \Lambda_2^{(u)} S_{2,(N/2)}^{(u)} + \bar{N}^{(u,1)}$$

$$\bar{Z}^{(u,2)} = (c^{(u,1)T} \otimes I_N)\bar{R}$$
$$= \Lambda_2^{(u)} W_N S_{1,(N/2)}^{(u)*} - \Lambda_1^{(u)} W_N S_{2,(N/2)}^{(u)*} + \bar{N}^{(u,2)}$$

In some examples $\bar{Z}^{(u,1)}$ and $\bar{Z}^{(u,2)}$ may be shown equivalently in matrix form as $\bar{Z}^{(u)}$ in equation (25).

$$\bar{Z}^{(u)} = \begin{bmatrix} \Lambda_1^{(u)} & \Lambda_2^{(u)} \\ W_N \Lambda_2^{(u)*} & -W_N \Lambda_1^{(u)*} \end{bmatrix} \begin{bmatrix} S_{1,(N/2)}^{(u)} \\ S_{2,(N/2)}^{(u)} \end{bmatrix} \begin{bmatrix} \bar{N}^{(u,1)} \\ \bar{N}^{(u,2)*} \end{bmatrix} \tag{25}$$

For example equation (25), $\bar{Z}^{(u)}[\bar{Z}^{(u,1)T}, \bar{Z}^{(u,2)T}]^T$ and a noise component of $\bar{N}^{(u,i)} = (c^{(u,i)T} \otimes I_{N/2})\bar{N}$. Since $S_{i,(N/2)}^{(u)} = mt;epmrl;\sqrt{1/2}rlxmx[S_i^{(u)T}, S_i^{(u)T}]^T$, example equation (25) can be written as function of $S_1^{(u)}$ and $S_1^{(u)}$ and $\bar{Z}^{(u)}$ can be shown as in example equation (26).

$$\bar{Z} = \sqrt{\frac{1}{2}} \begin{bmatrix} \Lambda_1^{1(u)} & \Lambda_2^{1(u)} \\ \Lambda_1^{2(u)} & \Lambda_2^{2(u)} \\ W_N^{(1)} \Lambda_2^{1(u)*} & -W_N^{(1)} \Lambda_1^{1(u)*} \\ W_N^{(2)} \Lambda_2^{2(u)*} & -W_N^{(2)} \Lambda_1^{2(u)*} \end{bmatrix} \begin{bmatrix} S_1^{(u)} \\ S_2^{(u)} \end{bmatrix} + \bar{N}^{(u)} \tag{26}$$

$$\triangleq \bar{\Lambda}^{(u)} S^{(u)} + \bar{N}^{(u)},$$

For example equation (26), $\Lambda_i^{1(u)}$ and $\Lambda_i^{2(u)}$ are an N/2×N/2 diagonal matrix whose diagonal elements are the first and second N/2 diagonal elements of $\Lambda_i^{(u)}$, respectively. Similarly, $W_N^{(1)}$ and $W_N^{(2)}$ are an N/2×N/2 diagonal matrix whose diagonal elements are the first and second N/2 diagonal elements of $W_N$. In some examples a linear receiver for receiver 120 may yield $\hat{S}^{(u)}$ as shown in example equation (27).

$$\hat{S}^{(u)} = (\bar{\Lambda}^{(u)H} \bar{\Lambda}^{(u)} + \alpha(N_0/E_s)I_N)^{-1} \bar{\Lambda}^{(u)} \bar{Z}^{(u)}, \tag{27}$$

For example equation (27), $\alpha$ may be defined as stated above for example equation (14). In some examples, Rx manager 122 may include logic configured to take an N/2-point IFFT to generate an estimate of data associated with a symbol. The estimate, for example, to occur in the time domain. The symbol to be estimated, for example, was included in a first and a second block of symbols received in a chip-block transmitted from transmitter 110 and further included in the received chip vector $\bar{R}_g$ generated as described above for example equation (21). The matrix $\bar{\Lambda}^{(u)H} \bar{\Lambda}^{(u)}$ may be diagonal and may be given by example equation (28).

$$\bar{\Lambda}^{(u)H} \bar{\Lambda}^{(u)} = 1/2 \begin{bmatrix} \bar{\Delta}^{(u)} & 0_{(N/2) \times (N/2)} \\ 0_{(N/2) \times (N/2)} & \bar{\Delta}^{(u)} \end{bmatrix} \tag{28}$$

For example equation (28), the N/2×N/2 diagonal matrix $\bar{\Delta}^{(u)}$ elements are given as shown in example equation (29).

$$\bar{\Delta}_{k,k}^{(u)} = |\Lambda_1^{(u)1}|_{k,k}^2 + |\Lambda_1^{(u)2}|_{k,k}^2 + |\Lambda_2^{(u)1}|_{k,k}^2 + |\Lambda_2^{(u)2}|_{k,k}^2 \tag{29}$$

In some examples, an output SNR of a matched filter for receiver 120 can be given by example equation (30).

$$\mu(k) = \frac{\bar{\Delta}_{k,k}^{(u)} \gamma_0}{2} \tag{30}$$

For example equation (30), $k = 0, 2, \ldots, N/2-1$ and $\gamma_0 = E_s/N_0$. It may be seen that the chip-interleaved-STS scheme may achieve a fourth order diversity and that the SNR $\mu(k)$ has a central chi-square distribution with eight degrees of freedom, and a probability density function (pdf) given by $p(\gamma) = (1/6\gamma_0^4)\gamma^3 \exp\{-\gamma/\gamma_0\}$.

Figure 6:
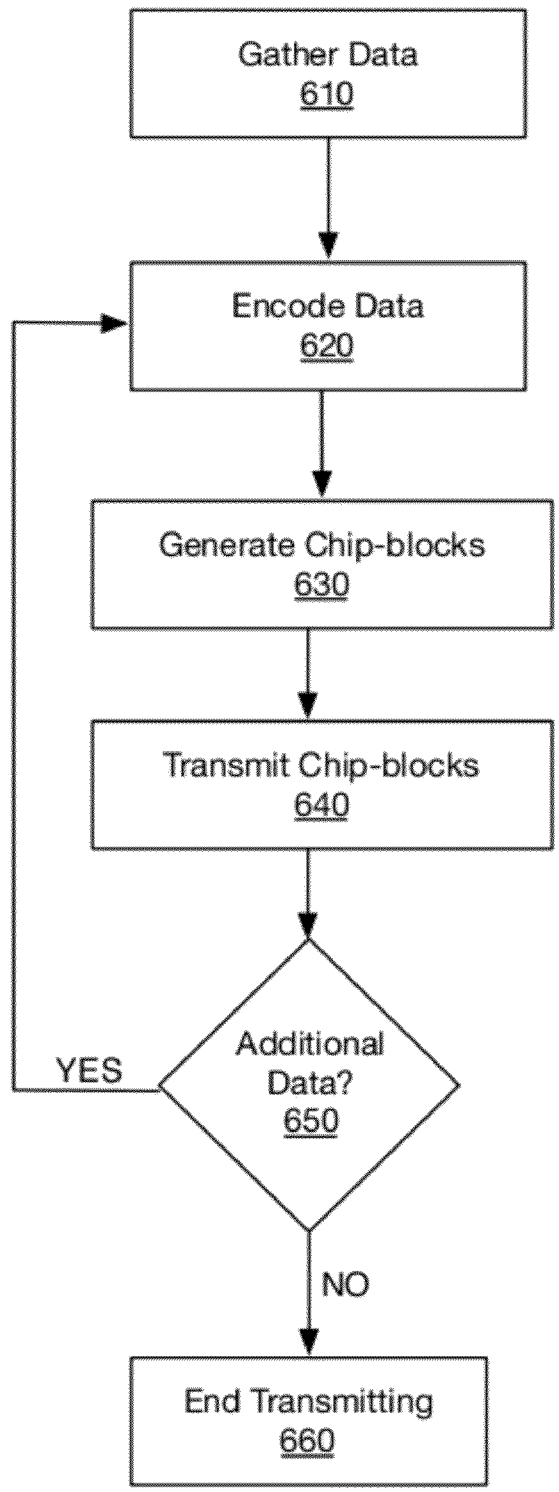
FIG. 6 illustrates a flow chart of example methods for generating and transmitting chip-blocks through multiple antennas over a single-carrier communication channel.

FIG. 6 illustrates a flow chart of example methods for generating and transmitting chip-blocks through multiple antennas over a single-carrier communication channel. In some examples, wireless communication system 100 as shown in FIG. 1, is used to illustrate example methods related to the flow chart depicted in FIG. 6. A transmitter 110 having a Tx manager 112, respectively, as shown in FIG. 2 may also be used to illustrate the example methods. But the described methods are not limited to implementations on wireless communication system 100 as shown in FIG. 1 or to the Tx manager 112 shown in FIG. 2. The example methods may be implemented on other wireless communication systems having one or more of the elements depicted in FIGS. 1 and 2.

Processing begins at block 610 (Gather Data), where the process gathers data (e.g., via symbol feature 212) maintained at and/or generated by a user of transmitter 110. The data may include voice, video, audio or other types of data to be transmitted from transmitter 110 to receiver 120 via single-carrier communication channel 130.

Processing continues from block 610 to block 620 (Encode Data), where Tx manager 112 may include logic configured to encode the data in blocks of symbols (e.g., via symbol feature 212). In some examples, the blocks of symbols may include a first block and a second block of symbols. Data encoded in the first block of symbols may also be included in the second block of symbols. The first and the second blocks of symbols may separately include N/2 data symbols. Similar to the blocks of symbols depicted in FIG. 4 and FIG. 5, the first block may be denoted as $s_1$ and the second blocks of symbols may be denoted as $s_2$.

Proceeding from block 620 to block 630 (Generate Chip-Blocks), the Tx manager 112 may include logic configured to spread $s_1$ and $s_2$ based, at least in part, on first and second assigned orthogonal spreading codes and then combine $s_1$ and $s_2$ to generate chip-blocks. Also, similar to the orthogonal spreading codes depicted in FIG. 4 and FIG. 5, the first orthogonal spreading code may be denoted as $c_1$ and the second orthogonal spreading code may be denoted as $c_2$. In some examples, $c_1$ and $c_2$ may separately have a length G. The length G may indicate a number of time domain blocks over which data symbols may be spread. For example, if G had a value of 2, spreading data symbols based, at least in part, on $c_1$ and $c_2$ may separately spread the data symbols over a first time domain block and a second time domain block.

In some examples, Tx antenna array 114 of transmitter 110 includes a first transmit antenna and a second transmit antenna. Similar to the Tx antenna array 114 shown in FIG. 4 and FIG. 5, the first transmit antenna may be denoted as $Tx_1$ and the second transmit antenna may be denoted as $Tx_2$.

In some examples, a chip-superimposed-STS scheme may be implemented by Tx manager 112 to spread and combine $s_1$ and $s_2$ (e.g., via spread/combine feature 214) to generate a first chip-block to be transmitted through $Tx_1$ and a second chip-block to be transmitted through $Tx_2$. The first chip-block and the second chip-block may separately include a first chip-subblock and a second chip-subblock. For these examples, example equation (2) may be implemented to form the first and second chip-subblocks. Similar to the chip-blocks depicted in FIG. 4, the first chip-block may be denoted as $X_1$ and the second chip-block may be denoted as $X_2$. Also, chip-subblocks included in $X_1$ may be denoted as $x_{1,g}$ and chip-subblocks included in $X_2$ may be denoted as $x_{2,g}$.

In some examples, a chip-interleaved-STS scheme may be implemented by Tx manager 112 to spread and combine $s_1$ and $s_2$ (e.g., via spread/combine feature 214) to generate a first chip-block to be transmitted through $Tx_1$ and a second chip-block to be transmitted through $Tx_2$. The first chip-block and the second chip-block may separately include a first chip-subblock and a second chip-subblock. For these examples, example equation (19) may be implemented to form the first and second chip-subblocks. Similar to the chip-blocks depicted in FIG. 5, the first chip-block may be denoted as $\bar{X}_1$ and the second chip-block may be denoted as $\bar{X}_2$. Also, chip-subblocks included in $\bar{X}_1$ may be denoted as $\bar{x}_{1,g}$ and chip-subblocks included in $\bar{X}_2$ may be denoted as $\bar{x}_{2,g}$.

In some examples, Tx manager 112 may also include logic configured to separately attach or add a cyclic prefix (CP) to chip-subblocks to avoid inter chip-subblock interference (ICSI). Based on use of either the chip-superimposed-STS scheme or the chip-interleaved-STS scheme, example equation (3) may be implemented (e.g., by spread/combine feature 214) to add the CP.

Processing continues from block 630 to block 640 (Transmit Chip-blocks), the process transmits or initiates transmission of (e.g., via transmit feature 218) chip-blocks, generated using either the chip-superimposed-STS scheme or the chip-interleaved-STS scheme, through $Tx_1$ and $Tx_2$. In some examples, the chip-blocks are to be transmitted over a single-carrier communication channel. Transmitting through $Tx_1$ and $Tx_2$ and over the single-carrier communication channel (e.g., single-carrier communication channel 130) may include STS transmitting spread and combined symbols of $s_1$ and $s_2$ in a sequential manner based, at least in part, on the orthogonal spreading codes $c_1$ and $c_2$.

Continuing from block 640 to decision block 650 (Additional Data?), the process determines (e.g., via symbol feature 212) whether additional data needs to be encoded and transmitted. If additional data needs to be encoded and transmitted, the process moves to block 620. Otherwise, the processing continues from decision block 650 to block 660.

In block 660 (End Transmitting), transmitting may be ended.

Figure 7:
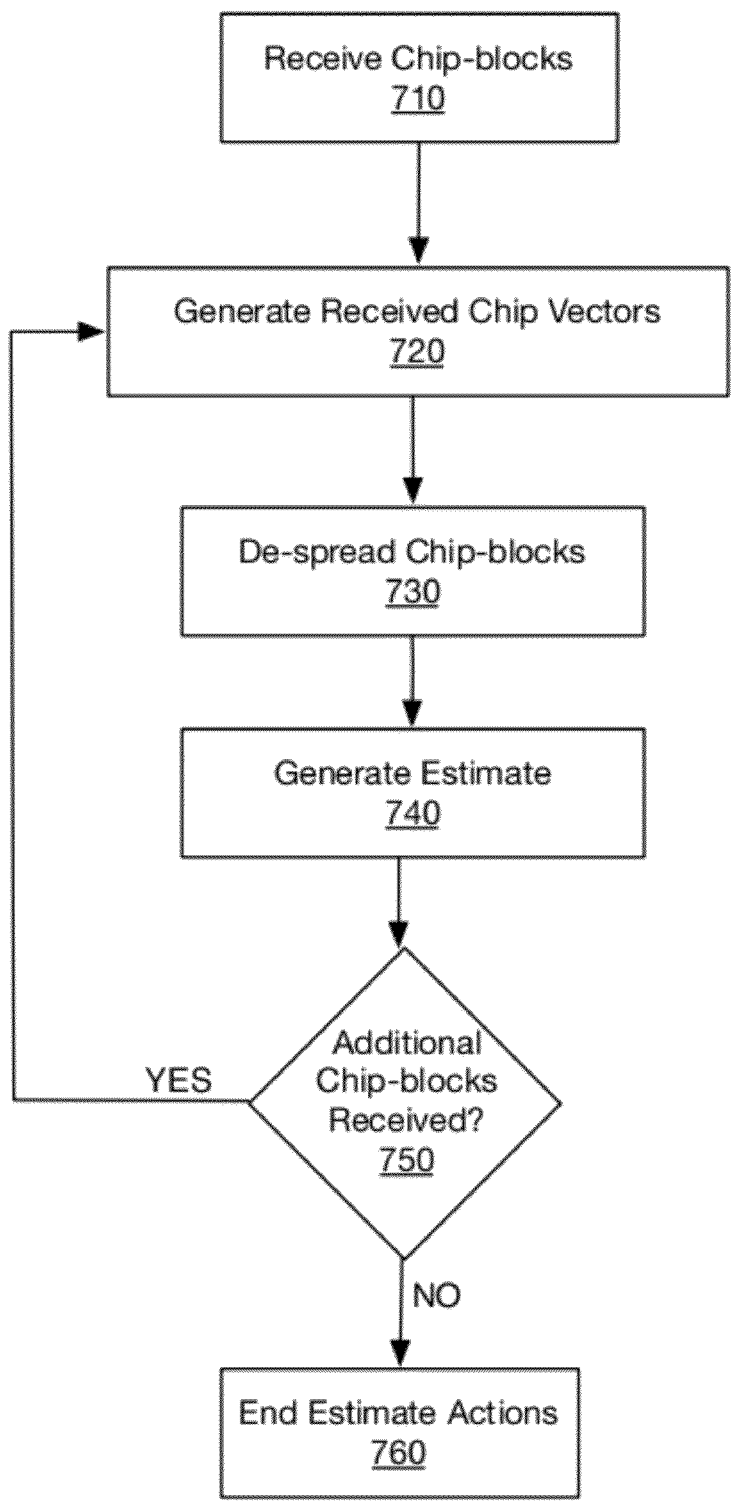
FIG. 7 illustrates a flow chart of example methods for receiving and decoding chip-blocks transmitted through multiple antennas over a single-carrier communication channel.

FIG. 7 illustrates a flow chart of example methods for receiving and decoding chip-blocks transmitted through multiple antennas over a single-carrier communication channel. In some examples, wireless communication system 100 as shown in FIG. 1, is used to illustrate example methods related to the flow chart depicted in FIG. 7. A receiver 120 having an Rx manager 122, as shown in FIG. 3, may also be used to illustrate the example methods. But the described methods are not limited to implementations on wireless communication system 100 as shown in FIG. 1 or to the Rx manager 122 shown in FIG. 3. The example methods may be implemented on other wireless communication systems having one or more of the elements depicted in FIGS. 1 and 3.

Processing begins at block 710 (Receive Chip-blocks), where Rx manager 122 may include logic (e.g., receive feature 312) configured to receive chip-blocks over a single-carrier communication channel (e.g., single-carrier communication channel 130). In some examples the received chip-blocks may include a first chip-block transmitted from a first antenna of transmitter 110 and a second chip-block transmitted from a second antenna of transmitter 110.

In some examples, the first and second chip-blocks may separately include a first chip-subblock and a second chip-subblock. The first and second chip-subblocks may further include a first block of symbols and a second block of symbols separately including N/2 data symbols. Similar to the blocks of symbols depicted in FIG. 4 and FIG. 5, the first block of symbols may be denoted as $s_1$ and the second block of symbols may be denoted as $s_2$. The symbols $s_1$ and $s_2$ may have been spread based, at least in part on a first orthogonal spreading code and a second orthogonal spreading code and then combined (e.g., using chip-superimposed-STS or chip-interleaved-STS schemes) to generate first and second chip-subblocks Processing continues from block 710 to block 720 (Generate Received Chip Vectors), where Rx manager 122 may include logic configured to generate received chip vectors (e.g., via vector feature 314). In some examples, a first received chip vector is generated from the first chip-block and a second received chip vector is generated from the second chip-block.

In some examples, the transmission scheme used to generate the first and second chip-blocks was chip-superimposed-STS. The first received chip vector may be generated by taking an N/2-point DFT of the first chip-block. The second received chip vector may be generated by taking an N/2-point DFT of the second chip-block. Rx manager 122 may include logic configured to implement example equation (7) to take the N/2-point DFT of the two chip-blocks (e.g., via vector feature 314). The N/2-point DFT, in these examples, is taken following removal of possible CPs attached to chip-subblocks included in the first and second chip-blocks.

In some examples, the transmission scheme used to generate the first and second chip-blocks was chip-interleaved-STS. The first received chip vector may be generated by taking an N-point DFT of the first chip-block. The second received chip vector may be generated by taking an N-point DFT of the second chip-block. Rx manager 122 may include logic configured to implement example equation (21) to take the N-point DFT of the two chip-blocks (e.g., via vector feature 314). The N/2-point DFT, in these examples, is taken following removal of possible CPs attached to chip-subblocks included in the first and second chip-blocks.

Proceeding from block 720 to block 730 (De-spread Chip-blocks), the Rx manager 122 may include logic (e.g., de-spread feature 316) to de-spread the first chip-block and the second chip-block separately included in the first and the second received chip vectors. In some examples, the transmission scheme used to generate the first and second chip-blocks from which the first and second received vectors were generated was chip-superimposed-STS. Based on use of a chip-superimposed-STS transmission scheme, de-spread feature 316 may implement example equation (11) to de-spread the first chip-block and the second chip-block. The de-spreading may occur in the frequency domain.

In some examples, the transmission scheme used to generate the first and second chip-blocks from which the first and second received vectors were generated was chip-superimposed-STS. Based on use of a chip-interleaved-STS transmission scheme, de-spread feature 316 may implement example equation (24) to de-spread the first chip-block and the second chip-block. The de-spreading may occur in the frequency domain.

Processing continues from block 730 to block 740 (Generate Estimate), the Rx manager 122 may include logic (e.g., estimate feature 318) to generate an estimate of data associated with a symbol included in the first and second block of symbols. In some examples, chip-superimposed-STS was the transmission scheme used to generate the first and second chip-blocks from which the symbol associated with the data was transmitted. Based on use of a chip-superimposed-STS transmission scheme, estimate feature 318 may implement example equations (14) and (15). Implementing example equations (14) and (15) may include estimate feature 318 taking an N/2-point inverse fast Fourier transform (IFFT) to generate the estimate. The estimate, for example, to occur in the time domain.

In some examples, chip-interleaved-STS was the transmission scheme used to generate the first and second chip-blocks from which the symbol associated with the data was transmitted. Based on use of a chip-interleaved-STS transmission scheme, estimate feature 318 may implement example equations (27) and (28). Implementing example equations (27) and (28) may include estimate feature taking an N/2-point inverse fast Fourier transform (IFFT) to generate the estimate. The estimate, for example, to occur in the time domain.

Proceeding from block 740 to decision block 750 (Additional Chip-blocks Received?), where Rx manager 122 determines whether additional chip-blocks have been received. If additional chip-blocks were received, the process moves to block 720. Otherwise, the processing continues from decision block 750 to block 760.

At block 760 (End Estimate Actions), where actions related to generating estimates for symbols may be ended.

FIG. 8 illustrates a block diagram of an example computer program product 800. In some examples, as shown in FIG. 8, computer program product 800 includes a signal bearing medium 802 that may also include instructions 804 for transmitting a first chip-block and a second chip-block over a single-carrier communication channel. Instructions 804, which, when executed by logic (e.g., Tx logic 210), may cause the logic to encode data in a first block of symbols and encode the data in a second block of symbols. Instructions 804 may also cause the logic to generate a first chip-block and a second chip-block. The first generated chip-block and the second generated chip-block may separately include the first block of symbols and the second block of symbols. The first block of symbols and the second block of symbols may have been spread based, at least in part, on a first orthogonal spreading code and a second orthogonal spreading code and then combined. Instructions 804 may further cause the logic to initiate a transmission of the first chip-block with a transmitter through a first antenna and initiate a transmission of the second chip-block with a transmitter through a second antenna.

Also depicted in FIG. 8, in some examples, computer product 800 may include one or more of a computer readable medium 806, a recordable medium 808 and a communications medium 810. The dotted boxes around these elements depict different types of mediums included within, but not limited to, signal bearing medium 802. These types of mediums may distribute instructions 804 to be executed by logic (e.g., Tx logic 210). Computer readable medium 806 and recordable medium 808 may include, but are not limited to, a flexible disk, a hard disk drive (HDD), a Compact Disc (CD), a Digital Video Disk (DVD), a digital tape, a computer memory, etc. Communications medium 810 may include, but is not limited to, a digital and/or an analog communication medium (e.g., a fiber optic cable, a waveguide, a wired communication link, a wireless communication link, etc.).

Figure 9:
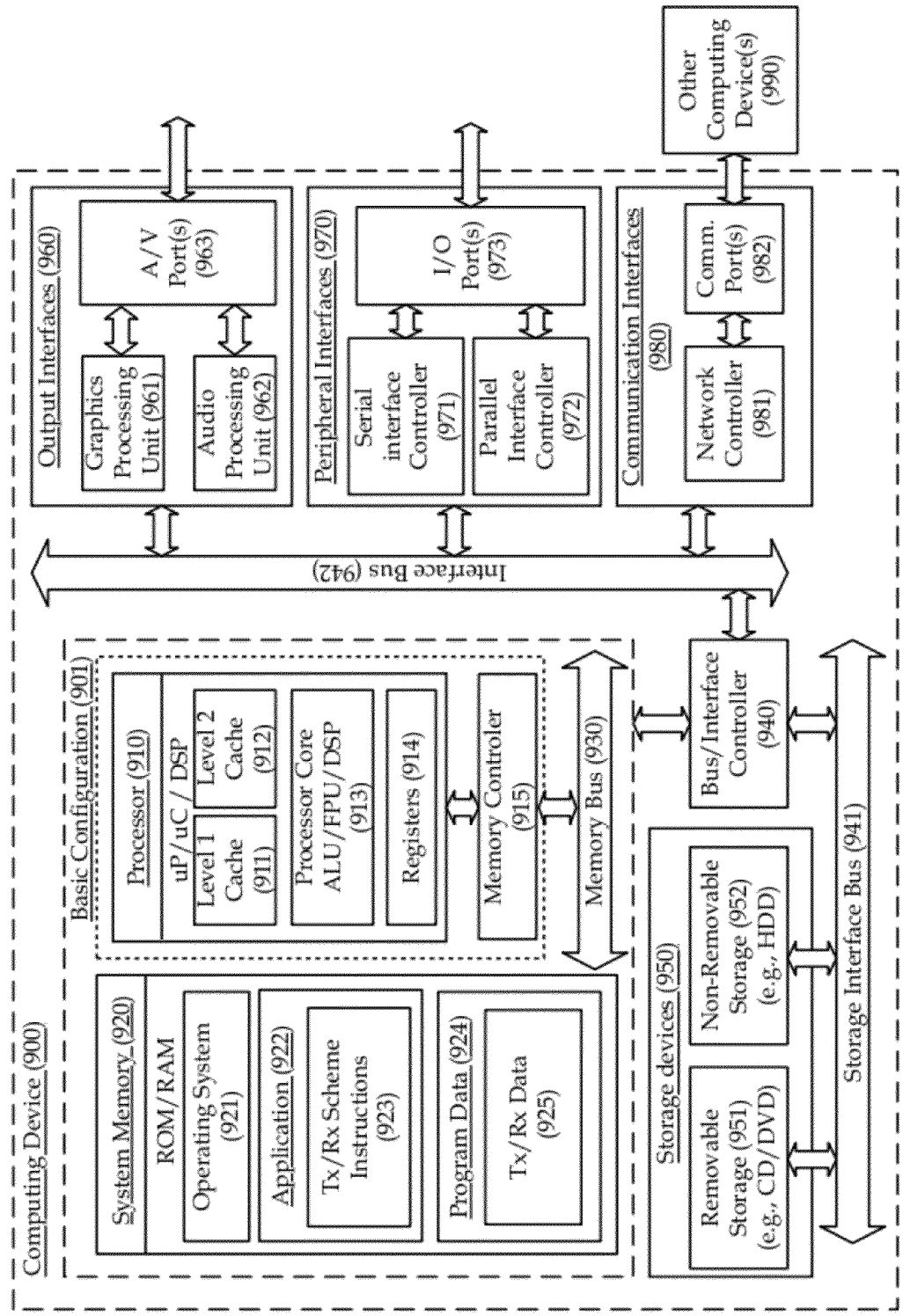
FIG. 9 illustrates an example computing device, all arranged in accordance with the present disclosure.

FIG. 9 illustrates an example computing device 900. In some examples, Tx manager 112 and/or Rx manager 122 depicted in FIGS. 1-3 may be implemented on computing device 900. In these examples, elements of computing device 900 may be arranged or configured to transmit and receive data encoded in symbols transmitted based on various STS schemes and to possibly decoded the data. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes instructions 923 that are arranged to perform the functions as described herein including the actions described with respect to Tx manager 112 or Rx manager architectures shown in FIGS. 2 and 3 or including the actions described with respect to the flow charts shown in FIGS. 6 and 7. Program Data 924 includes Tx/Rx data 925 that is useful for implementing Tx/Rx scheme instructions 923 (e.g., transmission scheme equations, decoding equations, etc.). In some examples, application 922 can be arranged to operate with program data 924 on an operating system 921 such that implementations of transmitting and receiving data encoded in symbols transmitted based on various STS schemes may be provided as described herein. This described basic configuration is illustrated in FIG. 9 by those components within dashed line 901.

Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more A/V ports 963. Example peripheral interfaces 960 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communications with one or more other computing devices 990 over a network communication via one or more communication ports 982. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for transmitting a first chip-block and a second chip-block over a single-carrier communication channel with a transmitter that is coupled to a first antenna and a second antenna, the method comprising:
   encoding data in a first block of symbols and encoding the data in a second block of symbols;
   generating the first chip-block and the second chip-block, the generated first chip-block and the generated second chip-block separately including the first block of symbols and the second block of symbols that have been spread based, at least in part, on a first orthogonal spreading code and a second orthogonal spreading code and then combined by superimposing and/or interleaving the spread block of symbols from the first block of symbols with the spread block of symbols from the second block of symbols; and
   transmitting over the single-carrier communication channel the first chip-block with the transmitter via the first antenna and transmitting the second chip-block with the transmitter via the second antenna.

2. A method according to claim 1, wherein the first orthogonal spreading code and the second orthogonal spreading code comprises the first orthogonal spreading code and the second orthogonal spreading code separately having a length associated with spreading the first block of symbols and the second block of symbols over a first time domain block and a second time domain block.

3. A method according to claim 1, wherein the first chip-block and the second chip-block comprises the first chip-block and the second chip-block separately including a first chip-subblock and a second chip-subblock, the first chip-subblock including the first block of symbols spread based on the first orthogonal spreading code and the second block of symbols spread based on the second orthogonal spreading code, the second chip-subblock including the first block of symbols spread based on the second orthogonal spreading code and the second block of symbols spread based on the first orthogonal spreading code.

4. A method according to claim 3, wherein the first chip-subblock and the second chip-subblock separately included in the first and second chip-blocks comprises the first chip-subblock and the second chip-subblock separately including a cyclic prefix to avoid inter chip-subblock interference.

5. A transmitter apparatus to transmit a first chip-block and a second chip-block over a single-carrier communication channel, the transmitter apparatus comprising:
   a transmit manager, the transmit manager including logic configured to:
      encode data in a first block of symbols and encode the data in a second block of symbols;
      generate a first chip-block and a second chip-block, the generated first chip-block and the generated second chip-block to separately include the first block of symbols and the second block of symbols that have been spread based, at least in part, on a first orthogonal spreading code and a second orthogonal spreading code and then combined by superimposing and/or interleaving the spread block of symbols from the first block of symbols with the spread block of symbols from the second block of symbols; and initiate a transmission over the single-carrier communication channel of the first chip-block with a transmitter via a first antenna and initiate a transmission of the second chip-block with the transmitter via a second antenna.

6. A transmitter system to transmit a first chip-block and a second chip-block over a single-carrier communication channel, the transmitter system comprising:
  an antenna array, the antenna array to include a first antenna and a second antenna; and
  a transmit manager, the transmit manager including logic configured to:
    encode data in the first block of symbols and encode the data in the second block of symbols;
    generate a first chip-block and a second chip-block, the generated first chip-block and the generated second chip-block to separately include the first block of symbols and the second block of symbols that have been spread based, at least in part, on a first orthogonal spreading code and a second orthogonal spreading code and then combined by superimposing and/or interleaving the spread block of symbols from the first block of symbols with the spread block of symbols from the second block of symbols; and
    initiate a transmission over the single-carrier communication channel of the first chip-block with a transmitter through the first antenna and initiate a transmission of the second chip-block through the second antenna of the transmitter.

7. A computer program product comprising a non-transitory computer readable medium having instructions for transmitting a first chip-block and a second chip-block over a single-carrier communication channel, which, when executed by logic, cause the logic to:
  encode data in a first block of symbols and encode the data in a second block of symbols;
  generate a first chip-block and a second chip-block, the generated first chip-block and the generated second chip-block to separately include the first block of symbols and the second block of symbols that have been spread based, at least in part, on a first orthogonal spreading code and a second orthogonal spreading code and then combined by superimposing and/or interleaving the spread block of symbols from the first block of symbols with the spread block of symbols from the second block of symbols; and
  initiate a transmission over the single-carrier communication channel of the first chip-block with a transmitter through a first antenna and initiate a transmission of the second chip-block with the transmitter through a second antenna.

* * * * *

UNITED STATES PATENT AND TRADEMARK OFFICE
CERTIFICATE OF CORRECTION

PATENT NO. : 8,275,019 B2
APPLICATION NO. : 12/485814
DATED : September 25, 2012
INVENTOR(S) : Bar-Ness et al.

It is certified that error appears in the above-identified patent and that said Letters Patent is hereby corrected as shown below:

On the Title Page, in Item (75), under "Inventors", in Column 1, Line 2, delete "Acolaste," and insert -- Acolatse, -- therefor.

In the Drawings:

In Fig. 9, Sheet 9 of 9, below "Processor (910)", in Line 1, delete "uP/uC/" and insert -- μP/μC/ --, therefor.

In Fig. 9, Sheet 9 of 9, in Box "(915)", in Line 1, delete "Controler" and insert -- Controller --, therefor.

In the Specification:

In Column 7, Line 57, delete "Gaussia" and insert -- Gaussian --, therefor.

In Column 11, Lines 66-67, delete

" $\overline{S}_{i,(N/2)}^{(u)} = mt;epmrl;\sqrt{1/2}rlxmx[S_i^{(u)T}, S_i^{(u)T}]^T$ ," and insert -- $S_{i,(N/2)}^{(u)} = \sqrt{1/2}\left[S_i^{(u)T}, S_i^{(u)T}\right]^T$ , --, therefor.

In Column 17, Line 31, delete "(HDD)," and insert -- (HDDs), --, therefor.

In Column 17, Line 33, delete "(SSD)," and insert -- (SSDs), --, therefor.

Signed and Sealed this
Twenty-sixth Day of November, 2013

Margaret A. Focarino
*Commissioner for Patents of the United States Patent and Trademark Office*